(12) United States Patent
Kannaka et al.

(10) Patent No.: US 10,001,360 B2
(45) Date of Patent: Jun. 19, 2018

(54) SHAPE MEASUREMENT DEVICE AND SHAPE MEASUREMENT METHOD

(71) Applicants: Kabushiki Kaisha Kobe Seiko Sho (Kobe Steel, Ltd.), Hyogo (JP); KOBELCO RESEARCH INSTITUTE, INC., Hyogo (JP)

(72) Inventors: Masato Kannaka, Kobe (JP); Kazuhiko Tahara, Kobe (JP); Hideki Matsuoka, Kobe (JP); Noritaka Morioka, Kobe (JP); Hidetoshi Tsunaki, Kobe (JP)

(73) Assignees: Kobe Steel, Ltd., Hyogo (JP); KOBELCO RESEARCH INSTITUTE, INC., Hyogo (JP)

( * ) Notice: Subject to any disclaimer, the term of this patent is extended or adjusted under 35 U.S.C. 154(b) by 0 days. days.

(21) Appl. No.: 15/507,488

(22) PCT Filed: Jul. 31, 2015

(86) PCT No.: PCT/JP2015/071820
§ 371 (c)(1),
(2) Date: Feb. 28, 2017

(87) PCT Pub. No.: WO2016/047274
PCT Pub. Date: Mar. 31, 2016

(65) Prior Publication Data
US 2017/0284788 A1    Oct. 5, 2017

(30) Foreign Application Priority Data
Sep. 26, 2014    (JP) .................................. 2014-197019

(51) Int. Cl.
*G01N 27/00*    (2006.01)
*G01B 7/28*    (2006.01)
(Continued)

(52) U.S. Cl.
CPC .................. *G01B 7/28* (2013.01); *G01B 7/08* (2013.01); *G01B 7/14* (2013.01); *G01B 11/06* (2013.01);
(Continued)

(58) Field of Classification Search
CPC ..... B29C 31/00; B29C 39/00; B29C 2791/00; B29C 2793/00; G02B 1/00; G02B 2207/00
See application file for complete search history.

(56) References Cited

U.S. PATENT DOCUMENTS 4,951,222 A * 8/1990 Hoffman .............. G01B 15/025
250/359.1
5,210,593 A   5/1993 Kramer
(Continued)

FOREIGN PATENT DOCUMENTS

DE       42 20 501 A1   1/1994
DE  10 2011 107 771 A1  10/2012
(Continued)

OTHER PUBLICATIONS

Notification of Transmittal of Translation of the International Preliminary Report on Patentability (Chapter I) and Translation of Written Opinion of the International Searching Authority; PCT/JP2015/071820; dated Apr. 6, 2017.
International Search Report issued in PCT/JP2015/071820; dated Oct. 13, 2015.

*Primary Examiner* — Jermele M Hollington
*Assistant Examiner* — Temilade Rhodes-Vivour
(74) *Attorney, Agent, or Firm* — Studebaker & Brackett PC

(57) ABSTRACT

A shape measurement device and a shape measurement method according to the present invention measure, for first and second distance measurement units which are disposed so as to be opposed to each other with a measurement object (Continued)

to be measured interposed therebetween and each measure a distance to the measurement object, first and second displacements of the first and second distance measurement units in an opposition direction, and obtain, as a shape of the measurement object, a thickness of the measurement object in the opposition direction, the thickness being corrected with the measured first and second displacements, based on first and second distance measurement results measured by the first and second distance measurement units, respectively.

5 Claims, 4 Drawing Sheets

(51) Int. Cl.
    *G01B 11/24*     (2006.01)
    *G01B 7/14*     (2006.01)
    *G01B 11/14*     (2006.01)
    *G01B 7/06*     (2006.01)
    *G01B 11/06*     (2006.01)
    *B29C 31/00*     (2006.01)
    *B29C 39/00*     (2006.01)

(52) U.S. Cl.
    CPC .......... *G01B 11/14* (2013.01); *G01B 11/2441* (2013.01); *B29C 31/00* (2013.01); *B29C 39/00* (2013.01); *G02B 2207/00* (2013.01)

(56) References Cited

U.S. PATENT DOCUMENTS

| | | | | |
|---|---|---|---|---|
| 5,253,039 | A * | 10/1993 | Fujimoto | G01B 11/024 356/606 |
| 6,441,905 | B1 | 8/2002 | Tojyo et al. | |
| 2004/0246471 | A1* | 12/2004 | Matsuura | G01S 7/4972 356/141.4 |
| 2009/0021747 | A1* | 1/2009 | Kawasaki | G01Q 10/065 356/501 |
| 2010/0232650 | A1* | 9/2010 | Kanetani | G01B 11/0608 382/106 |
| 2011/0279822 | A1* | 11/2011 | Kannaka | G01B 11/06 356/503 |
| 2013/0197844 | A1 | 8/2013 | Oota | |
| 2014/0101954 | A1 | 4/2014 | Sonntag et al. | |

FOREIGN PATENT DOCUMENTS

| | | |
|---|---|---|
| EP | 0 486 713 A1 | 5/1992 |
| JP | H11-230704 A | 8/1999 |
| JP | 2000-337858 A | 12/2000 |
| JP | 2002-202108 A | 7/2002 |
| JP | 2006-105878 | 4/2006 |
| JP | 2008-002945 A | 1/2008 |
| JP | 2010-175499 A | 8/2010 |
| JP | 2013-160516 A | 8/2013 |
| TW | 425472 B | 3/2001 |

* cited by examiner

SHAPE MEASUREMENT DEVICE AND SHAPE MEASUREMENT METHOD

TECHNICAL FIELD

The present invention relates to a shape measurement device which suitably measures a shape of a measurement object, for example, a shape of a plate-shaped body such as a semiconductor wafer in a non-contact manner, and a shape measurement method.

BACKGROUND ART

In recent years, elements have been more highly integrated in an integrated circuit. A process rule as a process condition for manufacturing an integrated circuit on a semiconductor wafer is ordinarily defined by a Minimum Feature Size in a line width or an interval of gate wires. When the process rule is halved, since theoretically, four times transistors or wires can be arranged in the same size of an area, the same number of transistors need one-fourth of the area. As a result, since not only the number of dies that can be manufactured from one semiconductor wafer is quadrupled but also a yield is ordinarily improved, more dies can be manufactured. The most advanced Minimum Feature Size for manufacturing a high density integrated circuit as of 2013 reaches 22 nm. Such a process rule on the order of sub-micrometer (1 µm or less) requires high flatness of a semiconductor wafer, and thus a surface shape (a change in a height of a surface) of a semiconductor wafer is not negligible. A shape measurement device is therefore demanded that measures a surface shape of a semiconductor wafer with high accuracy, for example, on the order of sub-nanometer (1 nm or less).

Here, a thin plate-shaped measurement object such as a semiconductor wafer may vibrate due to, for example, slight air pressure or vibration of another device, etc. Vibration caused in a measurement object might have an amplitude not negligible for the shape measurement with high accuracy. Therefore, the shape measurement with high accuracy needs a countermeasure against vibration of a measurement object. A shape measurement device having such a countermeasure against vibration is disclosed, for example, in Patent Literature 1 and Patent Literature 2.

The profile measuring apparatus disclosed in Patent Literature 1 is a profile measuring apparatus used for scanning front and back surfaces of a workpiece and measuring a thickness distribution of the workpiece in a non-contact manner, the profile measuring apparatus including first optical branching means for branching source light that is emitted from a predetermined light source into two pieces of light; optical guiding means for guiding the pieces of light branched by the first optical branching means in directions toward measurement portions on the front and back surfaces of the workpiece, the measurement portions facing each other; second optical branching means for further branching each of the pieces of light branched from the source light guided in the directions toward the measurement portions on each of front and back of the workpiece into two pieces of light; optical modulating means for modulating a frequency or frequencies of one or both of the pieces of light branched by the second optical branching means at each of the front and back of the workpiece, and generating two pieces of measurement light with different frequencies; two heterodyne interferometers that irradiate the measurement portion with one of the pieces of measurement light, and causes object light, which is the one of the pieces of measurement light reflected by the measurement portion, to interfere with reference light, which is the other of the pieces of measurement light, at each of the front and back of the workpiece; third optical branching means for branching each of the two pieces of measurement light into two pieces of light including main light, which is input to the heterodyne interferometer, and sub-light, which is other than the main light, at each of the front and back of the workpiece; sub-light interfering means for causing the two pieces of sub-light branched by the third optical branching means to interfere with each other, at each of the front and back of the workpiece; measurement optical system holding means for integrally holding a measurement optical system including the second optical branching means, the optical modulating means, the heterodyne interferometers, the third optical branching means, and the sub-light interfering means, at each of the front and back of the workpiece; measurement light intensity detecting means for receiving pieces of interfering light obtained by the two heterodyne interferometers and outputting intensity signals of the pieces of interfering light; reference light intensity detecting means for receiving interfering light obtained by the sub-light interfering means and outputting an intensity signal of the interfering light, at each of the front and back of the workpiece; and phase information detecting means for detecting phases of two beat signals including an output signal of the measurement light intensity detecting means and an output signal of the reference light intensity detecting means, and detecting a phase difference between the two beat signals, at each of the front and back of the workpiece. According to the recitation of Patent Literature 1, in the profile measuring apparatus having such a configuration as disclosed in Patent Literature 1, a measurement value of a thickness of the workpiece will be a measurement value obtained by cancelling a component of a displacement amount caused by vibration of the workpiece on both the front and back of the workpiece. Accordingly, the profile measuring apparatus is allowed to measure a thickness of the workpiece without being affected by vibration of the workpiece.

The measurement apparatus disclosed in Patent Literature 2 includes a mount unit configured to mount an object; a probe configured to move with respect to the object so as to measure a shape of the object; an interferometer configured to measure a position of the probe based on reflected light obtained by irradiating a reference mirror with light; and a calculator configured to calculate a shape of the object using a measurement value relating to the shape of the object that is obtained by moving the probe, and a relative displacement amount between the object and the reference mirror that is obtained based on a signal from a sensor for the object and the reference mirror. According to one mode, the sensor is a displacement amount sensor that detects the relative displacement between the object and the reference mirror, and the calculator corrects the measurement value using the relative displacement amount that is detected by the displacement sensor so as to calculate the shape of the object. According to another mode, the sensor is an acceleration sensor that detects a relative acceleration between the object and the reference mirror, and the calculator performs a second order integration of the relative acceleration so as to calculate the relative displacement amount between the object and the reference mirror, and corrects the measurement value using the relative displacement amount so as to calculate the shape of the object. According to the recitation in Patent Literature 2, a measurement apparatus having such a configuration enables measurement of a shape of an object with high accuracy even when a relative displacement is generated between a reference mirror and the object.

In a shape measurement device, however, not only a measurement object vibrates but also a measurement unit (sensor unit) for measuring a shape of the measurement object itself might vibrate. For example, in a case of Patent Literature 1, two heterodyne interferometers themselves might vibrate. Additionally, in a case of Patent Literature 2, for example, the probe itself might vibrate. Since such a vibration of the measurement unit itself also causes a change of a distance between a measurement unit and a measurement object, a countermeasure against vibration of a measurement unit itself is also demanded in the above shape measurement with high accuracy.

As described above, since the profile measuring apparatus disclosed in Patent Literature 1 cancels a component of a displacement amount caused by vibration of a workpiece on both the front and back of the workpiece, the apparatus is capable of coping with vibration of the workpiece itself but not with vibration of the measurement unit itself. Additionally, the measurement apparatus disclosed in Patent Literature 2 is capable of copying with relative displacement between a reference mirror and a workpiece but not with vibration of the measurement unit itself as described above.

CITATION LIST

Patent Literature

Patent Literature 1: Japanese Unexamined Patent Application Publication No. 2010-175499
Patent Literature 2: Japanese Unexamined Patent Application Publication No. 2013-160516

SUMMARY OF INVENTION

The present invention has been made in view of the above-described circumstances and aims at providing a shape measurement device and a shape measurement method each capable of measuring a shape of a measurement object with higher accuracy by reducing an effect caused by vibration of a measurement unit itself.

A shape measurement device and a shape measurement method according to the present invention measure, for first and second distance measurement units which are disposed so as to be opposed to each other with a measurement object to be measured interposed therebetween and which each measure a distance to the measurement object, first and second displacements of the first and second distance measurement units in an opposition direction, and obtain, as a shape of the measurement object, a thickness of the measurement object along the opposition direction, the thickness being corrected with the measured first and second displacements based on first and second distance measurement results measured by the first and second distance measurement units, respectively. Accordingly, such a shape measurement device and a shape measurement method enable measurement of a shape of a measurement object with higher accuracy by reducing an effect caused by vibration of the measurement unit itself.

The foregoing, and other objects, features, and advantages of the present invention will become apparent from the following detailed description and the accompanying drawings.

DESCRIPTION OF EMBODIMENTS

In the following, one embodiment of the present invention will be described with reference to the drawings. Throughout the drawings, components given the same reference marks represent the same components, descriptions therefor will be omitted as required. In the present specification, generally named components will be given reference marks without subscripts and individually represented components will be given reference marks with subscripts.

Figure 1:
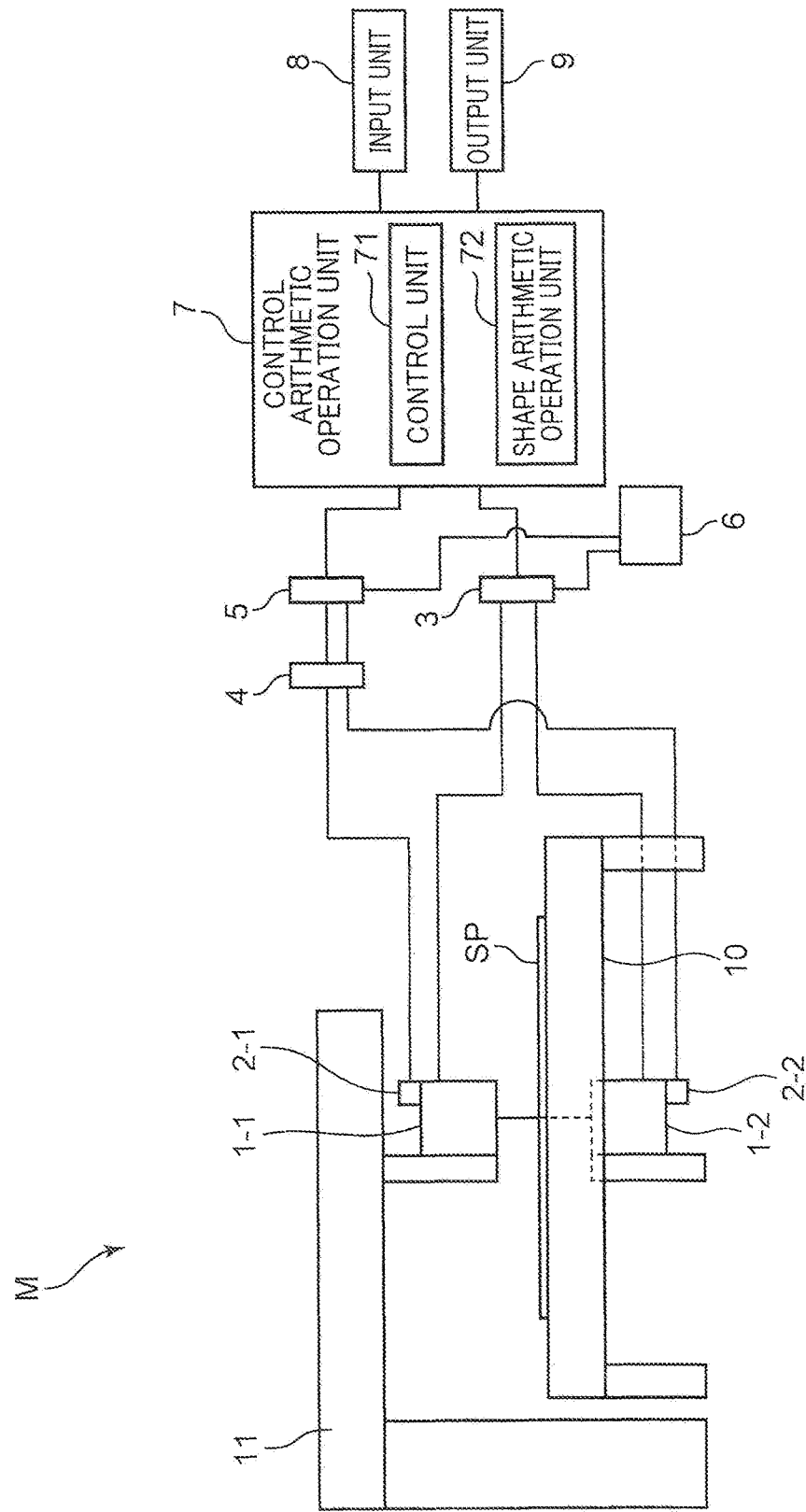
FIG. 1 is a diagram showing a configuration of a shape measurement device according to an embodiment.
Figure 2:
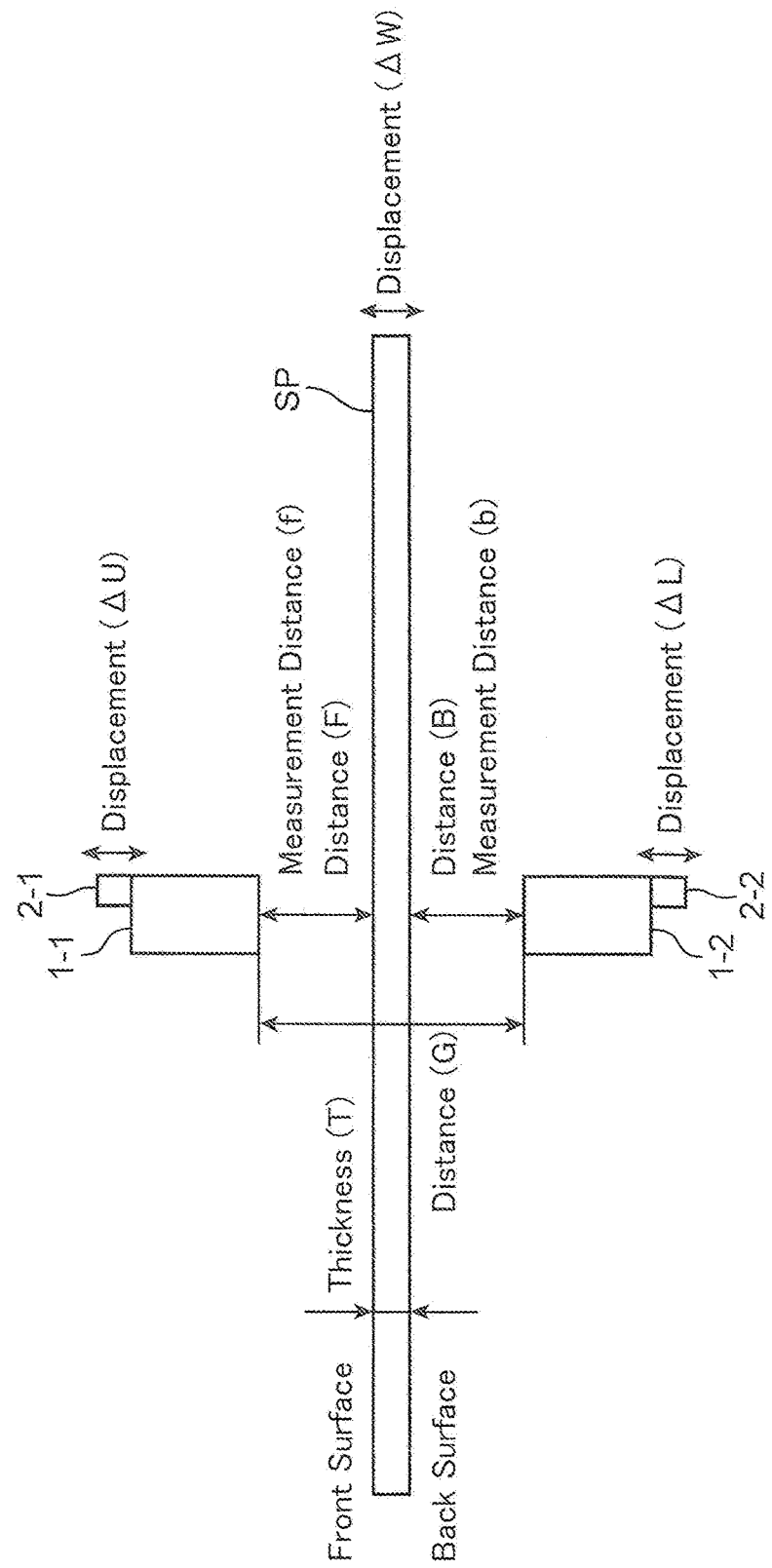
FIG. 2 is a diagram for illustrating a method of arithmetic operation of a shape (thickness) in the shape measurement device according to the embodiment.

FIG. 1 is a diagram showing a configuration of a shape measurement device according to the embodiment. FIG. 2 is a diagram for illustrating a method of arithmetic operation of a shape (thickness) in the shape measurement device according to the embodiment.

The shape measurement device according to the present embodiment includes first and second distance measurement units which are disposed so as to be opposed to each other with a measurement object to be measured interposed therebetween and which each measure a distance to the measurement object; first and second displacement measurement units which measure respective displacements of the first and second distance measurement units in an opposition direction; and a shape arithmetic operation unit which obtains, as a shape of the measurement object, a thickness of the measurement object along the opposition direction, the thickness being corrected with first and second displacement measurement results measured by the first and second displacement measurement units, respectively, based on first and second distance measurement results measured by the first and second distance measurement units, respectively. In such a shape measurement device, a displacement of the first distance measurement unit is measured by the first displacement measurement unit and a displacement of the second distance measurement unit is measured by the second displacement measurement unit. Thus, in the shape measurement device according to the present embodiment, a displacement of each of the first and second distance measurement units caused by, for example, vibration is actually measured. Then, in the shape measurement device according to the present embodiment, a thickness of a measurement object along the opposition direction is obtained as a shape of the measurement object, the thickness being corrected with the first and second displacement measurement results measured by the first and second displacement measurement units, respectively, based on the first and second distance measurement results measured by the first and second distance measurement units, respectively. Thus, in the shape measurement device according to the present embodiment, when a shape of a measurement object is obtained, the displacement in each of the first and second distance measurement units is considered. Accordingly, the shape measurement device according to the present embodiment enables an effect caused by vibration of the first and second distance measurement units themselves to be reduced, thereby measuring a shape of the measurement object with higher accuracy.

Such a shape measurement device M according to the present embodiment more specifically includes, for example, as shown in FIG. 1, first and second distance sensors 1-1, 1-2, first and second acceleration sensors 2-1, 2-2, a first analog/digital conversion unit (hereinafter, abbreviated as a "first AD conversion unit") 3, a preprocessing unit 4, a second analog/digital conversion unit (hereinafter, abbreviated as a "second AD conversion unit") 5, a sampling timing generation unit (hereinafter, abbreviated as a "ST generation unit") 6, a control arithmetic operation unit 7, an input unit 8, an output unit 9, a movable stage unit 10, and a support unit 11.

The first and second distance sensors 1-1, 1-2 are devices which are disposed so as to be opposed to each other with a measurement object SP to be measured interposed therebetween and which each measure a distance to the measurement object SP. The first and second distance sensors 1-1, 1-2 are connected to the first AD conversion unit 3. The first distance sensor 1-1 outputs its output to the first AD conversion unit 3 and the second distance sensor also outputs its output to the first AD conversion unit 3. For example, being supported by the support unit 11, the first distance sensor 1-1 is disposed at an upper side with respect to a placing face, on which the measurement object SP is placed, of a placing table of the movable stage unit 10 and disposed at a position apart from the placing face by a predetermined distance (a first distance sensor arrangement position). Being supported by the support unit 11, the second distance sensor 1-2 is disposed at a lower side with respect to the placing face and disposed at a position apart from the placing face by a predetermined distance (a second distance sensor arrangement position).

Although a disposition position of each of the first distance sensor 1-1, the second distance sensor 1-2, and the movable stage unit 10 may be adjusted such that the placing face is located closer to the first distance sensor 1-1 side or to the second distance sensor 1-2 side, in the present embodiment, the disposition position of each of the first distance sensor 1-1, the second distance sensor 1-2, and the movable stage unit 10 is adjusted such that the placing face is disposed at a central position between the first distance sensor 1-1 and the second distance sensor 1-2. In other words, the first and second distance sensors 1-1, 1-2 are respectively disposed at positions symmetrical to the placing face. With the first and second distance sensors 1-1, 1-2 thus disposed at positions at an equal distance from the placing face, when the first and second distance sensors 1-1, 1-2 themselves vibrate to be displaced, a ratio of each displacement amount caused by the vibration to each measurement value (each distance) measured by each of the first and second distance sensors 1-1, 1-2 becomes generally equal, so that each displacement caused by the vibration will generally equally affect each measurement value (each distance) measured by each of the first and second distance sensors 1-1, 1-2. Accordingly, the shape measurement device M is allowed to correct each measurement value measured by each of the first and second distance sensors 1-1, 1-2 with each displacement amount caused by the vibration so as to generally the same accuracy, thereby obtaining a shape of a measurement object with higher accuracy.

Although the first and second distance sensors 1-1, 1-2 can actually measure a distance to the measurement object SP, in view of measurement of a distance on the order of nanometer, in the present embodiment, by measuring, for example, with respect to a reference set in advance, each relative distance change (a displacement amount of a displacement with respect to the reference) of the measurement object SP, each distance (a relative distance with respect to the reference) to the measurement object SP is measured. In the present embodiment, as will be described later, since a length of the measurement object SP along an opposition direction, i.e. a thickness and a distribution thereof (thickness distribution) are obtained as a shape of the measurement object SP, the reference is set to be a center thickness of the measurement object SP measured by another appropriate measurement device in advance. The center thickness is an average value or a median of a plurality of thicknesses measured at a plurality of measurement positions of the measurement object SP. The opposition direction is a direction in which the first distance sensor 1-1 (the second distance sensor 1-2) is opposed to the second distance sensor 1-2 (the first distance sensor 1-1) (facing direction), i.e. a direction along a line segment linking the disposition position of the first distance sensor 1-1 and the disposition position of the second distance sensor 1-2. For measuring a displacement amount (shift amount) of the displacement, such first and second distance sensors 1-1, 1-2 are each configured with a displacement sensor of any of, for example, optical interference type, confocal type, electrostatic capacitance type, and laser triangulation type.

The optical interference type displacement sensor includes an optical interferometer that splits measurement light into signal light and reference light, irradiates a measurement object SP with the signal light, and makes the signal light reflected by the measurement object SP and the reference light interfere with each other to generate interference light. The optical interference type displacement sensor measures the interference light generated by the optical interferometer to measure a displacement amount. Specifically, when the measurement object SP is displaced from a reference, a light path length of the signal light changes from a light path corresponding to the reference, so that the interference light changes, and a displacement amount can be obtained from that change.

A confocal type displacement sensor measures a displacement amount by irradiating a measurement object SP with pieces of branched white light as multicolored light through a multi-lens, and measuring a focused color. Specifically, since a focal length varies with a wavelength, when the measurement object SP is displaced from a reference, a color (wavelength) focused on the measurement object SP changes from a color (wavelength) corresponding to the reference, so that a displacement amount can be obtained from the color change.

An electrostatic capacitance type displacement sensor measures a displacement amount by measuring an electrostatic capacitance between the displacement sensor (probe) and a measurement object SP. Specifically, since when the measurement object SP is displaced from a reference, an electrostatic capacitance is changed from a reference electrostatic capacitance corresponding to the reference, a displacement amount can be obtained from a change amount thereof.

A laser triangulation type displacement sensor measures a displacement amount based on the principle of so-called triangulation. With the laser triangulation type displacement sensor, a measurement object SP is irradiated with a laser beam, and reflected light thereof is received by an area sensor, thereby measuring a displacement of the measurement object SP based on a light reception position. Specifically, since when the measurement object SP is displaced from a reference, the light reception position shifts from a light reception reference position corresponding to the reference, a displacement amount can be obtained from a shift amount thereof, based on the principle of triangulation.

Here, in view of suitable measurement of a shape of a measurement object SP on the order of sub-nanometer, the first and second distance sensors 1-1, 1-2 are each preferably configured with an optical interference type displacement sensor or an electrostatic capacitance type displacement sensor. In the present embodiment, the first and second distance sensors 1-1, 1-2 are each preferably configured with an optical heterodyne type optical interference displacement sensor (a displacement sensor of a heterodyne optical interferometer). The optical heterodyne type optical interference displacement sensor is a device that makes signal light and reference light having slightly different frequencies interfere with each other while being overlapped, and obtains a phase difference from a beat signal caused by obtained interference light to measure a displacement amount. The optical heterodyne type optical interference displacement sensor is disclosed, for example, in Patent Document 1 described above.

The first AD conversion unit 3 is a device which is connected to the ST generation unit 6 and the control arithmetic operation unit 7; samples each output (each displacement amount in the present embodiment) of the first and second distance sensors 1-1, 1-2 at sampling timing input from the ST generation unit 6; converts the same from an analog signal into a digital signal; and outputs each output (each of the displacement amounts) of the first and second distance sensors 1-1, 1-2, as each converted digital signal, to the control arithmetic operation unit 7.

The first acceleration sensor 2-1 is a device which measures an acceleration (a first acceleration) of the first distance sensor 1-1 in the opposition direction in order to measure a displacement of the first distance sensor 1-1 in the opposition direction. The second acceleration sensor 2-2 is similarly a device which measures an acceleration (a second acceleration) of the second distance sensor 1-2 in the opposition direction in order to measure a displacement of the second distance sensor 1-2 in the opposition direction. The first and second acceleration sensors 2-1, 2-2 are connected to the preprocessing unit 4. The first acceleration sensor 2-1 outputs its output (the first acceleration) to the preprocessing unit 4, and the second acceleration sensor 2-2 also outputs its output (the second acceleration) to the preprocessing unit 4. The first acceleration sensor 2-1 is disposed at a position at which an acceleration of the first distance sensor 1-1 in the opposition direction can be measured, and the second acceleration sensor 2-2 is disposed at a position at which an acceleration of the second distance sensor 1-2 in the opposition direction can be measured. For example, the first and second acceleration sensors 2-1, 2-2 are each disposed on any of a front surface, a back surface, and a side surface of a casing of the first and second distance sensors 1-1, 1-2, respectively. Additionally, for example, the first acceleration sensor 2-1 may be disposed at a supporting member formed of a rigid body which supports the first distance sensor 1-1, and the second acceleration sensor 2-2 may be disposed at a supporting member formed of a rigid body which supports the second distance sensor 1-2. Each of the supporting members formed of any rigid body can be considered to be displaced in the same manner as the first and second distance sensors 1-1, 1-2. In the present embodiment, the first acceleration sensor 2-1 is disposed on the front surface of the first distance sensor 1-1, and the second acceleration sensor 2-2 is disposed on the back surface of the second distance sensor 1-2.

The preprocessing unit 4 is a device which is connected to the second AD conversion unit 5 and which conducts predetermined preprocessing with respect to each output of the first and second acceleration sensors 2-1, 2-2 in order to obtain each displacement amount of each predetermined displacement in the first and second distance sensors 1-1, 1-2, and outputs each output of the first and second acceleration sensors 2-1, 2-2 subjected to the preprocessing to the second AD conversion unit 5. The preprocessing unit 4 in the present embodiment includes, for example, an integration unit which integrates each output (each acceleration) of the first and second acceleration sensors 2-1, 2-2 twice in order to convert an acceleration into a displacement amount, and a band-path filter unit which extracts only predetermined frequency band data (a predetermined frequency component) from each output (each displacement amount) of the first and second acceleration sensors 2-1, 2-2 integrated by the integration unit.

The second AD conversion unit 5 is a device which is connected to the ST generation unit 6 and the control arithmetic operation unit 7; samples each output (each displacement amount obtained from each acceleration in the present embodiment) of the first and second acceleration sensors 2-1, 2-2 subjected to preprocessing by the preprocessing unit 4 at sampling timing input from the ST generation unit 6; converts the same from an analog signal into a digital signal; and outputs each output (each of the displacement amounts) of the first and second acceleration sensors 2-1, 2-2, as each converted digital signal, to the control arithmetic operation unit 7.

The ST generation unit 6 is a device which generates sampling timing (each AD conversion timing) of each of the first and second AD conversion units 3, 5, and includes, for example, an oscillation circuit using a crystal oscillator. The ST generation unit 6 outputs the same sampling timing to both the first AD conversion unit 3 and the second AD conversion unit 5. This causes the first AD conversion unit 3 and the second AD conversion unit 5 to conduct sampling at the same timing to convert an analog signal to a digital signal. Accordingly, an output of the first distance sensor 1-1 as a digital signal output from the first AD conversion unit 3, an output of the second distance sensor 1-2 as a digital signal output from the first AD conversion unit 3, an output of the first acceleration sensor 2-1 as a digital signal output from the second AD conversion unit 5, and an output of the second acceleration sensor 2-2 as a digital signal output from the second AD conversion unit 5 are data in synchronization with each other, i.e. data obtained by measurement at the same time (timing).

The input unit 8 is an apparatus which is connected to the control arithmetic operation unit 7 and inputs, to the shape measurement device M, various kinds of commands, for example, a command for instructing on a start of shape measurement of the measurement object SP or the like, and various kinds of data necessary for measuring a shape, for example, an input of an identifier in the measurement object SP or the like. Examples of the input unit 8 include a plurality of input switches to which predetermined functions are assigned, a keyboard, a mouse, and the like. The output unit 9 is an apparatus which is connected to the control arithmetic operation unit 7 and outputs a command or data input from the input unit 8, and a shape of the measurement object SP measured by the shape measurement device M, according to control by the control arithmetic operation unit 7. Examples of the output unit 9 include a display device such as a CRT display, a LCD, and an organic EL display, a printing device such as a printer, and the like.

The input unit 8 and the output unit 9 may each configure a touch panel. In a case where a touch panel is configured with these units, the input unit 8 is, for example, a resistive film type, an electrostatic capacitance type or other type position input device which detects and inputs an operation position, and the output unit 9 is a display device. In the touch panel, the position input device is provided on a display surface of the display device, and when a candidate for one or a plurality of input contents that can be input is displayed on the display device and a user touches a display position at which a required input content is displayed, the position input device detects the touched position and a display content displayed at the detected position is input to the shape measurement device M as a content input by user's operation. Since such a touch panel is easy for a user to intuitively understand input operation, a shape measurement device M easy to be handled by a user is provided.

The movable stage unit 10 is a device which relatively shifts the measurement object SP and the first and second distance sensors 1-1, 1-2 within a plane orthogonal to the opposition direction according to control by the control arithmetic operation unit 7. The movable stage unit 10 corresponds to one example of a shifting mechanism unit. Although the shifting mechanism unit may be a device which shifts the first and second distance sensors 1-1, 1-2 within the plane relative to the measurement object SP, the present embodiment adopts the movable stage unit 10 which shifts a relatively light-weight measurement object SP within the plane relative to the first and second distance sensors 1-1, 1-2. The movable stage unit 10 may be a so-called XY stage which is capable of shifting the measurement object SP in a X-axis direction and a Y-axis direction or the movable stage unit 10 may be alternatively a rotation stage capable of rotationally shifting the measurement object SP, as well as shifting the same in a radial direction of the rotation. In the present embodiment, the movable stage unit 10 is a rotation stage, which is disclosed, for example, in Patent Literature 1. More specifically, the movable stage unit 10 includes a placing unit on which a measurement object is placed, a rotation unit which rotationally drives the placing unit, and a linear movement unit which linearly shifts the rotation unit. The placing unit includes a rotation shaft, and first to third placing arms. The first to third placing arms each include a horizontal arm unit extending in a radial direction of rotation of the rotation unit and a vertical arm unit connected to one end of the horizontal arm unit and extending in the opposition direction (vertical direction, axis direction). Accordingly, the first to third placing arms are each columnar members formed into generally L-shape in a side view. The rotation shaft is a columnar member extending in the opposition direction and has the other end engaged with the rotation unit so as to be rotated by the rotation unit. The first to third placing arms are connected to one end of the rotation shaft at a generally equal interval of about 120° at the other end of the horizontal arm unit. Each front end surface of each of the vertical arm units of the first to third placing arms is a placing face on which the measurement object SP is placed. Therefore, the measurement object SP is supported at three points from below by each front end surface (each placing face) of each of the vertical arm units of the first to third placing arms. When the measurement object SP is, for example, a circular plate-shaped semiconductor wafer, the semiconductor wafer is supported, at three points in a circumferential edge (edge portion) thereof, from below by the respective front end surfaces (the respective placing faces) of the vertical arm units of the first to third placing arms. The rotation unit and the linear movement unit each include, for example, an actuator such as a servo motor or the like, or a driving mechanism such as a reduction gear or the like. Then, when the measurement object SP is placed on a rotation stage as one example of the movable stage unit 10, the rotation stage is disposed relative to arrangement positions of the first distance sensor 1-1 and the second distance sensor 1-2 such that the front surface and the back surface of the measurement object SP can be measured by the first and second distance sensors 1-1, 1-2, respectively, i.e. such that the rotation stage does not interfere with each measurement of the first and second distance sensors 1-1, 1-2. With such a rotation stage, rotationally driving the placing unit by the rotation unit enables a measurement position of the measurement object SP in a circumference direction to be changed and shifting the rotation unit by the linear movement unit enables a measurement position of the measurement object SP in the radial direction to be changed. Accordingly, such a rotation stage enables an arbitrary position in the measurement object SP to be selected as a measurement position.

The movable stage unit 10 is controlled by a suspension and preferably further includes an air suspension which supports the placing unit. An air suspension is a vibration isolation mechanism using an air spring.

The support unit 11 is a member for supporting each unit required to be maintained at an appropriate disposition position in the shape measurement device M, such as the first and second distance sensors 1-1, 1-2, the movable stage unit 10, or the like.

The control arithmetic operation unit 7 controls each unit of the shape measurement device M according to a function of the unit to obtain a shape of a measurement object. The control arithmetic operation unit 7 is configured, for example, with a microcomputer including a CPU (Central Processing Unit); a non-volatile storage element such as a ROM (Read Only Memory) or an EEPROM (Electrically Erasable Programmable Read Only Memory) which previously stores various programs to be executed by the CPU, data necessary for the execution thereof, and the like; a volatile storage element such as a RAM (Random Access Memory) as a so-called working memory of the CPU; and a peripheral circuit. Then, in the control arithmetic operation unit 7, a control unit 71 and a shape arithmetic operation unit 72 are functionally configured by execution of a program.

The control unit 71 controls each unit of the shape measurement device M according to a function of the unit in order to obtain a shape of a measurement object.

The shape arithmetic operation unit 72 obtains, as a shape of the measurement object SP, a thickness of the measurement object SP along the opposition direction, the thickness being corrected by first and second displacement measurement results measured by first and second displacement measurement units, respectively, based on first and second distance measurement results measured by first and second distance measurement units, respectively. In the present embodiment, the first distance sensor 1-1 corresponds to one example of the first distance measurement unit, and the second distance sensor 1-2 corresponds to one example of the second distance measurement unit. Then, the first acceleration sensor 2-1, and the preprocessing unit 4 correspond to one example of the first displacement measurement unit, and the second acceleration sensor 2-2 and the preprocessing unit 4 correspond to one example of the second displacement measurement unit.

Here, as one example, a thickness of the measurement object SP in consideration of each displacement of the first and second distance sensors 1-1, 1-2 is obtained as follows. When in FIG. 2, a thickness (Thickness) of the measurement object SP is represented as T, a displacement (Displacement)

of the measurement object SP as μW, a distance (Distance) between the first distance sensor 1-1 and the second distance sensor 1-2 along the opposition direction as G, a distance (Measurement of Distance) from the first distance sensor 1-1 to a front surface (Front Surface) of the measurement object SP measured by the first distance sensor 1-1 as f, an actual distance (Distance) from the first distance sensor 1-1 to the front surface of the measurement object SP as F, a displacement (Displacement) of the first distance sensor 1-1 measured by the first acceleration sensor 2-1 as $\Delta U$, a distance (Measurement of Distance) from the second distance sensor 1-2 to a back surface (Back Surface, a surface opposed to the front surface) of the measurement object SP measured by the second distance sensor 1-2 as b, an actual distance (Distance) from the second distance sensor 1-2 to the back surface of the measurement object SP as B, and a displacement (Displacement) of the second distance sensor 1-2 measured by the second acceleration sensor 2-2 as $\Delta L$, the following Expression (1) holds among f, F, $\Delta W$, and $\Delta U$, and the following Expression (2) holds among b, B, $\Delta W$, and $\Delta L$.

$$f = F + \Delta W + \Delta U \quad (1)$$

$$b = B - \Delta W + \Delta L \quad (2)$$

Then, among T, G, F and B, the following Expression (3) holds, in which taking a displacement of the measurement object SP into consideration results in the following Expression (4).

$$T = G - (F + B) \quad (3)$$

$$T = G - (F + \Delta W + B - \Delta W) \quad (4)$$

When taking the above Expression (1) and Expression (2) into consideration, the above Expression (4) results in the following Expression (5).

$$T = G - (f - \Delta U + b - \Delta L) \quad (5)$$

Here, the above f corresponds to the first distance measurement result, the above $\Delta U$ corresponds to the first displacement measurement result, the above b corresponds to the second distance measurement result, the above $\Delta L$ corresponds to the second displacement measurement result, and the above G corresponds to a clearance between the first distance measurement unit (the first distance sensor 1-1) and the second distance measurement unit (the second distance sensor 1-2) along the opposition direction. Accordingly, the shape arithmetic operation unit 72 more specifically obtains a first corrected distance (f−$\Delta U$) by correcting the first distance measurement result f with the first displacement measurement result $\Delta U$, obtains a second corrected distance (b−$\Delta L$) by correcting the second distance measurement result b with the second displacement measurement result $\Delta L$, and obtains the thickness T (=G−(f−$\Delta U$+b−$\Delta L$)) by subtracting the first corrected distance (f−$\Delta U$) and the second corrected distance (b−$\Delta L$) from the clearance G between the first distance measurement unit and the second distance measurement unit along the opposition direction.

Then, in the present embodiment, for obtaining a thickness distribution of the measurement object SP, with the measurement object SP and the first and second distance measurement units (the first and second distance sensors 1-1, 1-2) relatively shifted within a plane orthogonal to the opposition direction by the movable stage unit 10, the first and second distance measurement units measure, at each of a plurality of measurement positions of the measurement object SP, a distance to the measurement object SP; the first and second displacement measurement units (the first acceleration sensor 2-1 and the preprocessing unit 4, and the second acceleration sensor 2-2 and the preprocessing unit 4) each measure a displacement in the opposition direction in synchronization with timing at which the first and second distance measurement units measure a distance to the measurement object SP at each of the plurality of measurement positions; and the shape arithmetic operation unit 72 obtains a thickness of the measurement object SP along the opposition direction, the thickness being corrected with the first and second displacement measurement results measured by the first and second displacement measurement units, respectively, based on the first and second distance measurement results measured by the first and second distance measurement units, respectively, at each of the plurality of measurement positions, thereby obtaining a thickness distribution of the measurement object SP as a shape of the measurement object SP.

The shape measurement device M may further include an interface unit which is a circuit connected to the control arithmetic operation unit 7 and conducts data input/output to/from an external apparatus according to control by the control arithmetic operation unit 7. Examples of the interface unit include a serial communication type interface circuit of RS-232C, an interface circuit using the Bluetooth (registered trademark) standard, an interface circuit of the IrDA (Infrared Data Association) standard or the like which conducts infrared communication, an interface circuit using the USB (Universal Serial Bus) standard, and the like.

Figure 3:
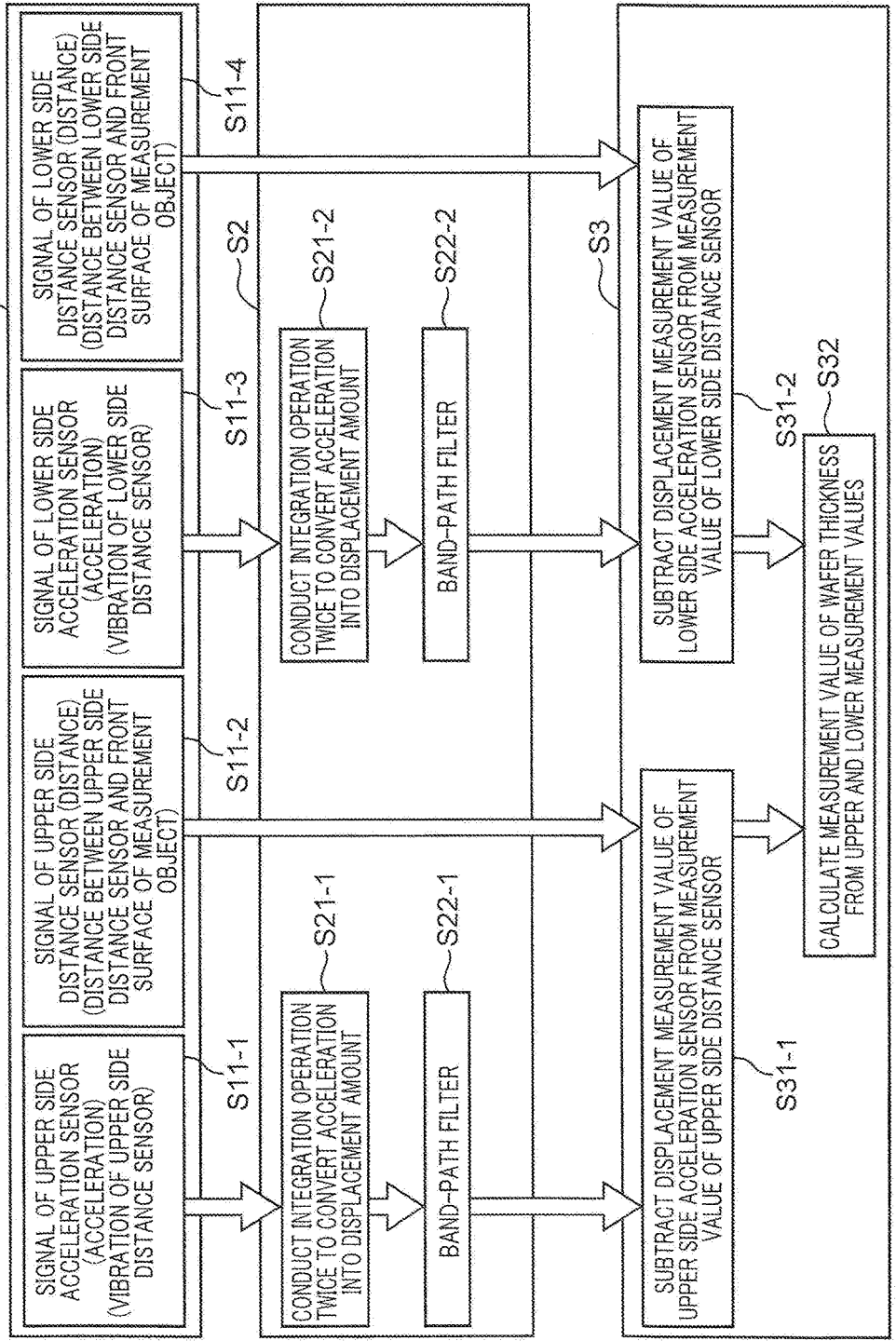
FIG. 3 is a flow chart showing operation of the shape measurement device according to the embodiment.

Next, operation of the shape measurement device M according to the present embodiment will be described. FIG. 3 is a flow chart showing operation of the shape measurement device according to the present embodiment.

First, when a power source switch not shown is turned on, the shape measurement device M is started and the control arithmetic operation unit 7 initializes each necessary unit, so that in the control arithmetic operation unit 7, the control unit 71 and the shape arithmetic operation unit 72 are functionally configured by execution of a program. Then, the measurement object SP such as a semiconductor wafer is placed on the movable stage unit 10, and at a reception of a command instructing on start of measurement from the input unit 8, the control arithmetic operation unit 7 starts measurement of a shape of the measurement object SP.

When the measurement is started, the first and second distance sensors 1-1, 1-2 and the first and second acceleration sensors 2-1, 2-2 start measurement and output obtained measurement results (S1).

More specifically, the first acceleration sensor 2-1 measures a first acceleration of the first distance sensor 1-1 in the opposition direction and outputs the measured first acceleration to the preprocessing unit 4 (S11-1). The first acceleration represents a vibration of the first distance sensor 1-1. The first distance sensor 1-1 measures a distance to the front surface of the measurement object SP and outputs the measured distance to the first AD conversion unit 3 (S11-2). Then, the second acceleration sensor 2-2 measures a second acceleration of the second distance sensor 1-2 in the opposition direction and outputs the measured second acceleration to the preprocessing unit 4 (S11-3). The second acceleration represents a vibration of the second distance sensor 1-2. The second distance sensor 1-2 measures a distance to the back surface of the measurement object SP and outputs the measured distance to the first AD conversion unit 3 (S11-4).

Next, the preprocessing unit 4 executes preprocessing of the first acceleration from the first acceleration sensor 2-1 and preprocessing of the second acceleration from the second acceleration sensor 2-2 (S2).

More specifically, the preprocessing unit 4 integrates the first acceleration from the first acceleration sensor 2-1 twice by the integration unit to obtain a displacement amount (a first displacement amount) of the first distance sensor 1-1 (S21-1), filters the obtained first displacement amount of the first distance sensor 1-1 by the band-path filter unit to obtain the first displacement amount of a predetermined frequency component, and outputs the obtained first displacement amount of the predetermined frequency component to the second AD conversion unit 5 (S22-1). The preprocessing unit 4 integrates the second acceleration from the second acceleration sensor 2-2 twice by the integration unit to obtain a displacement amount (a second displacement amount) of the second distance sensor 1-2 (S21-2), filters the obtained second displacement amount of the second distance sensor 1-2 by the band-path filter unit to obtain the second displacement amount of a predetermined frequency component, and outputs the obtained second displacement amount of the predetermined frequency component to the second AD conversion unit 5 (S22-2).

Next, the first and second AD conversion units 3, 5 operate in synchronization with each other at sampling timing from the ST generation unit 6. More specifically, the first AD conversion unit 3 samples an output of the first distance sensor 1-1 at the sampling timing to convert an analog signal to a digital signal and outputs the converted output of the first distance sensor 1-1 to the control arithmetic operation unit 7 as the first distance measurement result f. Similarly, the first AD conversion unit 3 samples an output of the second distance sensor 1-2 at the sampling timing to convert an analog signal to a digital signal and outputs the converted output of the second distance sensor 1-2 to the control arithmetic operation unit 7 as the second distance measurement result b. Then, the second AD conversion unit 5 samples an output (in the present embodiment, the first displacement amount of the predetermined frequency component obtained by the preprocessing unit 4) of the first acceleration sensor 2-1 at the sampling timing to convert an analog signal to a digital signal and outputs the converted output of the first acceleration sensor 2-1 to the control arithmetic operation unit 7 as the first displacement measurement result $\Delta U$. The second AD conversion unit 5 samples an output (in the present embodiment, the second displacement amount of the predetermined frequency component obtained by the preprocessing unit 4) of the second acceleration sensor 2-2 at the sampling timing to convert an analog signal to a digital signal and outputs the converted output of the second acceleration sensor 2-2 to the control arithmetic operation unit 7 as the second displacement measurement result $\Delta L$.

Then, the shape arithmetic operation unit 72 of the control arithmetic operation unit 7 obtains, as a shape of the measurement object SP, the thickness T of the measurement object SP along the opposition direction, the thickness being corrected with the first and second displacement measurement results $\Delta U$, $\Delta L$ based on the first and second distance measurement results f, b and outputs the obtained result to the output unit 9 to end the processing (S3).

More specifically, the shape arithmetic operation unit 72 corrects the first distance measurement result f with the first displacement measurement result $\Delta U$ by subtracting the first displacement measurement result $\Delta U$ from the first distance measurement result f, thereby obtaining the first corrected distance (f–$\Delta U$) (S31-1). The shape arithmetic operation unit 72 corrects the second distance measurement result b with the second displacement measurement result $\Delta L$ by subtracting the second displacement measurement result $\Delta L$ from the second distance measurement result b, thereby obtaining the second corrected distance (b–$\Delta L$) (S31-2). Then, the shape arithmetic operation unit 72 obtains the thickness T (=G–(f–$\Delta U$+b–$\Delta L$)) by subtracting the first corrected distance (f–$\Delta U$) and the second corrected distance (b–$\Delta L$) from the clearance G between the first distance sensor 1-1 and the second distance sensor 1-2 along the opposition direction and outputs the obtained result to the output unit 9 to end the processing (S32).

Here, in the present embodiment, since the first distance sensor 1-1 is a displacement sensor, the first distance sensor 1-1 measures a displacement amount of the front surface of the measurement object SP and outputs the measured displacement amount to the first AD conversion unit 3, and since the second distance sensor 1-2 is a displacement sensor, the second distance sensor 1-2 measures a displacement amount of the back surface of the measurement object SP and outputs the measured displacement amount to the first AD conversion unit 3. The shape arithmetic operation unit 72 subtracts the first displacement measurement result $\Delta U$ from a displacement amount $\Delta f$ of the front surface (front surface displacement amount) of the measurement object SP sampled by the first AD conversion unit 3 and measured by the first distance sensor 1-1 to correct the front surface displacement amount $\Delta f$ with the first displacement measurement result $\Delta U$, thereby obtaining a first corrected front surface displacement amount ($\Delta f$–$\Delta U$), and subtracts the second displacement measurement result $\Delta L$ from a displacement amount $\Delta b$ of the back surface (back surface displacement amount) of the measurement object SP sampled by the first AD conversion unit 3 and measured by the second distance sensor 1-2 to correct the back surface displacement amount $\Delta b$ with the second displacement measurement result $\Delta L$, thereby obtaining a second corrected back surface displacement amount ($\Delta b$–$\Delta L$). Then, the shape arithmetic operation unit 72 obtains the thickness T (=Tc–($\Delta f$–$\Delta U$+$\Delta b$–$\Delta L$)) by subtracting the first corrected front surface displacement amount ($\Delta f$–$\Delta U$) and the second corrected back surface displacement amount ($\Delta b$–$\Delta L$) from the above-described reference (the center thickness) Tc.

Then, for obtaining a thickness distribution, according to control by the control arithmetic operation unit 7, the movable stage unit 10 sequentially shifts the measurement object SP to a plurality of measurement positions set in advance and after shifting to each measurement position, outputs a signal notifying a shift end (a shift end notification signal, a position feedback signal) to the control arithmetic operation unit 7. With the shift end notification signal as a trigger, the control arithmetic operation unit 7 executes each processing of the above processing at S1 to processing at S3 at each measurement position to measure each thickness at each measurement position. When each thickness at each measurement position is measured, the movable stage unit 10 is stopped to end the measurement. At the time of ending the measurement, the movable stage unit 10 may be controlled to be at an initial position. The plurality of measurement positions are set on the measurement object SP, for example, such that when sequentially connected, the plurality of measurement positions forms a spiral line segment. This realizes measurement of a thickness distribution of the measurement object SP in which each thickness is assigned to each measurement position.

As described in the foregoing, in the shape measurement device M and the shape measurement method implemented therein according to the present embodiment, displacement of the first distance sensor (one example of the first distance measurement unit) 1-1 is measured by the first acceleration sensor 2-1 and the preprocessing unit 4 (one example of the first displacement measurement unit), and displacement of the second distance sensor (one example of the second distance measurement unit) 1-2 is measured by the second acceleration sensor 2-2 and the preprocessing unit 4 (one example of the second displacement measurement unit) to then obtain, as a shape of the measurement object SP, the thickness T of the measurement object SP along the opposition direction, the thickness being corrected with the first and second displacement measurement results ΔU, ΔL based on the first and second distance measurement results f, b. Accordingly, the shape measurement device M and the shape measurement method implemented therein according to the present embodiment enable an effect caused by vibration of the first and second distance sensors 1-1, 1-2 themselves to be reduced to measure a shape of the measurement object SP with higher accuracy.

Figure 4A:
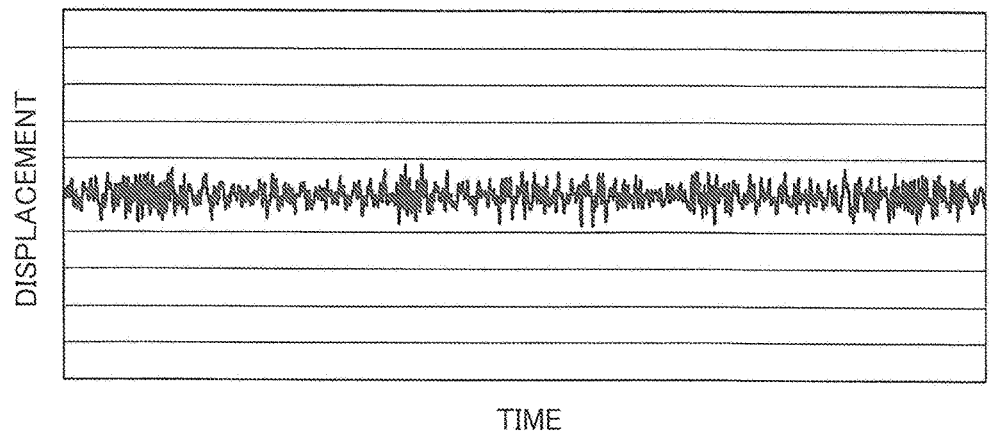
FIG. 4 is a diagram showing one measurement result for illustrating an effect of correction.
Figure 4B:
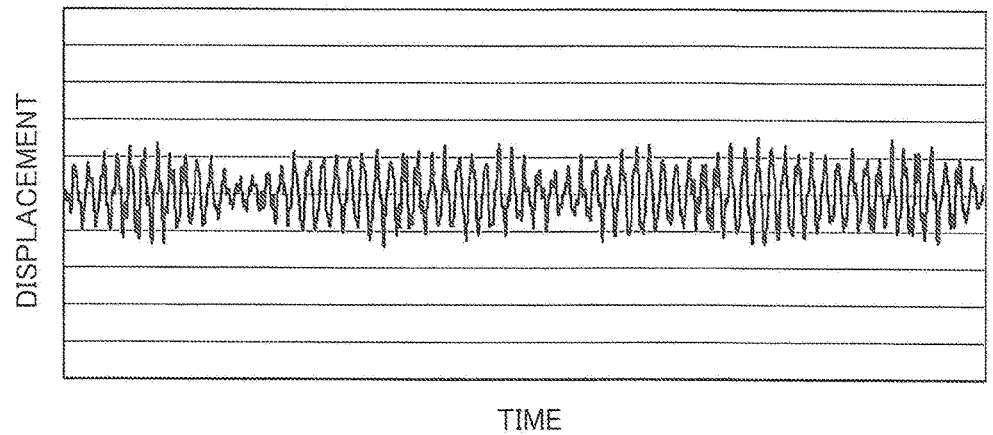

As one example, an effect of correction is shown in FIG. 4. FIG. 4 is a diagram showing one measurement result for illustrating the effect of correction. FIG. 4A shows corrected data and FIG. 4B shows data yet to be corrected. In this measurement, in order to examine an effect of displacement of the second distance sensor 1-2 itself, the measurement object SP is fixed so as not to be displaced and an optical interference type displacement sensor is used as the second distance sensor 1-2. As a result of the measurement, the back surface displacement amount Δb of the second distance sensor 1-2, before being corrected, varies with a relatively large amplitude as shown in FIG. 4B, while after being corrected, an amplitude of the second corrected back surface displacement amount (Δb−ΔL) is small as shown in FIG. 4A, in which an effect obtained by the correction can be found.

The shape measurement device M and the shape measurement method implemented therein according to the present embodiment further include the movable stage unit (one example of the shifting mechanism unit) 10 which relatively shifts the measurement object SP and the first and second distance sensors 1-1, 1-2 within a plane orthogonal to the opposition direction, in which a thickness of the measurement object SP is measured at a plurality of measurement positions thereof, so that a thickness distribution within the plane of the measurement object SP can be measured.

Although in the foregoing, the description has been made of a device with a semiconductor wafer as one example of a measurement object SP laterally supported (horizontal direction), the present invention is also applicable to a device with a semiconductor wafer as one example of a measurement object SP vertically supported (perpendicular direction).

The present specification discloses the techniques in various modes as described above, of which the main technique is summarized in the following.

The shape measurement device according to one mode includes first and second distance measurement units which are disposed so as to be opposed to each other with a measurement object to be measured interposed therebetween and each measure a distance to the measurement object, first and second displacement measurement units which measure a displacement of the first and second distance measurement units in the opposition direction, respectively, and a shape arithmetic operation unit which obtains, as a shape of the measurement object, a thickness of the measurement object along the opposition direction, the thickness being corrected with first and second displacement measurement results measured by the first and second displacement measurement units, respectively, based on first and second distance measurement results measured by the first and second distance measurement units, respectively.

In such a shape measurement device, a displacement of the first distance measurement unit is measured by the first displacement measurement unit and a displacement of the second distance measurement unit is measured by the second displacement measurement unit, and a thickness of a measurement object along the opposition direction is obtained as a shape of the measurement object based on first and second distance measurement results measured by the first and second distance measurement units, the thickness being corrected with first and second displacement measurement results measured by the first and second displacement measurement units, respectively. Accordingly, such a shape measurement device enables an effect caused by vibration of the first and second distance measurement units themselves to be reduced to measure a shape of the measurement object with higher accuracy.

In another mode, the above-described shape measurement device further includes a shifting mechanism unit which relatively shifts the measurement object and the first and second distance measurement units within a plane orthogonal to the opposition direction, in which by relatively shifting the measurement object and the first and second distance measurement units within the plane by the shifting mechanism unit, the first and second distance measurement units measure, at each of a plurality of measurement positions of the measurement object, a distance to the measurement object, the first and second displacement measurement units each measure a displacement in the opposition direction in synchronization with timing at which the first and second distance measurement units measure a distance to the measurement object at each of the plurality of measurement positions, and the shape arithmetic operation unit obtains a thickness of the measurement object along the opposition direction, the thickness being corrected with first and second displacement measurement results measured by the first and second displacement measurement units, respectively, based on first and second distance measurement results measured by the first and second distance measurement units, respectively at each of the plurality of measurement positions, thereby obtaining a thickness distribution of the measurement object as a shape of the measurement object.

Such a shape measurement device further includes a shifting mechanism unit which relatively shifts the measurement object and the first and second distance measurement units within a plane orthogonal to the opposition direction, in which a thickness of the measurement object is measured at a plurality of positions, so that a thickness distribution within the plane of the measurement object can be measured.

In another mode, in the above-described shape measurement devices, the first and second distance measurement units each include an optical interference type displacement sensor or an electrostatic capacitance type displacement sensor which measures a distance to the measurement object based on a displacement of the measurement object relative to a reference set in advance and measures a displacement amount of the displacement. Then, in the above shape measurement device, the optical interference type displacement sensor preferably includes a heterodyne optical interferometer.

Since in such a shape measurement device, the first and second distance measurement units each include an optical interference type displacement sensor or an electrostatic capacitance type displacement sensor, a shape of a measurement object can be suitably measured on the order of sub-nanometer.

Then, a shape measurement method according to another mode includes a distance measurement step of measuring a distance to a measurement object to be measured by first and second distance measurement units which are disposed so as to be opposed to each other with the measurement object interposed therebetween, a displacement measurement step of measuring each displacement of the first and second distance measurement units in an opposition direction by first and second displacement measurement units, respectively, and a shape arithmetic operation step of obtaining, as a shape of the measurement object, a thickness of the measurement object along the opposition direction, the thickness being corrected with first and second displacement measurement results measured by the first and second displacement measurement units, respectively, at the displacement measurement step based on first and second distance measurement results measured by the first and second distance measurement units, respectively, at the distance measurement step.

In such a shape measurement method, a displacement of the first distance measurement unit is measured by the first displacement measurement unit and a displacement of the second distance measurement unit is measured by the second displacement measurement unit, and a thickness of a measurement object along the opposition direction is obtained as a shape of the measurement object based on first and second distance measurement results measured by the first and second distance measurement units, the thickness being corrected with first and second displacement measurement results measured by the first and second displacement measurement units, respectively. Accordingly, such a shape measurement method enables an effect caused by vibration of the first and second distance measurement units themselves to be reduced to measure a shape of the measurement object with higher accuracy.

The present application claims priority from Japanese Patent Application No. 2014-197019 filed on Sep. 26, 2104, disclosures of which is all incorporated herein.

Although in order to express the present invention, the present invention has been appropriately and fully described with respect to the embodiment with reference to the drawings in the foregoing, it should be recognized that those skilled in the art can easily modify and/or improve the above embodiment. Accordingly, unless otherwise a modification or an improvement made by those skilled in the art is on a level departing from the scope of claims for patent recited in Claims, the modification or the improvement are construed to be covered by the scope of claims for patent.

INDUSTRIAL APPLICABILITY

According to the present invention, a shape measurement device and a shape measurement method can be provided.

The invention claimed is:

1. A shape measurement device comprising:
first and second distance measurement units which are disposed so as to be opposed to each other with a measurement object to be measured therebetween, and which each measure a distance to the measurement object;
first and second displacement measurement units which are disposed on the first and second distance measurement units and constituted by first and second acceleration sensors, respectively, for measuring a displacement of the first and second distance measurement units in an opposition direction, respectively; and
a shape arithmetic operation unit which obtains, as a shape of the measurement object, a thickness of the measurement object along the opposition direction, the thickness being corrected with first and second displacement measurement results measured by the first and second displacement measurement units, respectively, based on first and second distance measurement results measured by the first and second distance measurement units, respectively.

2. The shape measurement device according to claim 1, further comprising a shifting mechanism unit which relatively shifts the measurement object and the first and second distance measurement units within a plane orthogonal to the opposition direction,
wherein
by relatively shifting the measurement object and the first and second distance measurement units within the plane by the shifting mechanism unit, the first and second distance measurement units measure, at each of a plurality of measurement positions of the measurement object, a distance to the measurement object,
the first and second displacement measurement units each measure a displacement in the opposition direction in synchronization with timing at which the first and second distance measurement units measure a distance to the measurement object at each of the plurality of measurement positions, and
the shape arithmetic operation unit obtains a thickness of the measurement object along the opposition direction, the thickness being corrected with the first and second displacement measurement results measured by the first and second displacement measurement units, respectively, based on first and second distance measurement results measured by the first and second distance measurement units, respectively at each of the plurality of measurement positions, so that a thickness distribution of the measurement object is obtained as a shape of the measurement object.

3. The shape measurement device according to claim 1, wherein the first and second distance measurement units each include an optical interference type displacement sensor or an electrostatic capacitance type displacement sensor which measures a distance to the measurement object based on a displacement of the measurement object relative to a reference set in advance and measures a displacement amount of the displacement.

4. The shape measurement device according to claim 2, wherein the first and second distance measurement units each include an optical interference type displacement sensor or an electrostatic capacitance type displacement sensor which measures a distance to the measurement object based on a displacement of the measurement object relative to a reference set in advance and measures a displacement amount of the displacement.

5. A shape measurement method comprising:
a distance measurement step of measuring a distance to a measurement object to be measured by first and second distance measurement units disposed so as to be opposed to each other with the measurement object therebetween;
a displacement measurement step of disposing first and second displacement measurement units constituted by first and second acceleration sensors on the first and second distance measurement units and measuring a displacement of the first and second distance measurement units in an opposition direction, respectively; and
a shape arithmetic operation step of obtaining, as a shape of the measurement object, a thickness of the measurement object along the opposition direction, the thickness being corrected with first and second displacement measurement results measured by the first and second displacement measurement units, respectively, at the displacement measurement step based on first and second distance measurement results measured by the first and second distance measurement units, respectively, at the distance measurement step.

\* \* \* \* \*